United States Patent
Habeck

(10) Patent No.: US 7,836,992 B2
(45) Date of Patent: Nov. 23, 2010

(54) DRIVETRAIN FOR VEHICLES WITH ALL-WHEEL DRIVE AND A TRANSMISSION ARRANGED ALONG THE TRAVEL DIRECTION

(75) Inventor: Dirk Habeck, Langenargen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 142 days.

(21) Appl. No.: 12/349,718

(22) Filed: Jan. 7, 2009

(65) Prior Publication Data
US 2009/0173563 A1 Jul. 9, 2009

(30) Foreign Application Priority Data
Jan. 9, 2008 (DE) .................... 10 2008 000 017

(51) Int. Cl.
*B60K 17/34* (2006.01)
*B60K 17/354* (2006.01)

(52) U.S. Cl. .................... 180/233; 180/240; 180/245

(58) Field of Classification Search ............. 180/233, 180/240, 245
See application file for complete search history.

(56) References Cited

U.S. PATENT DOCUMENTS

| | | | | |
|---|---|---|---|---|
| 1,249,160 A | * | 12/1917 | Martiny | 180/261 |
| 1,258,126 A | * | 3/1918 | Ledbetter | 180/245 |
| 3,262,512 A | * | 7/1966 | O'Brien | 180/245 |
| 3,814,201 A | * | 6/1974 | O'Brien | 180/245 |
| 4,289,213 A | * | 9/1981 | Seaman | 180/233 |
| 4,688,447 A | * | 8/1987 | Dick | 74/665 T |
| 4,781,265 A | * | 11/1988 | Weiler et al. | 180/233 |
| 5,107,951 A | * | 4/1992 | Kawamura | 180/248 |
| 5,116,293 A | * | 5/1992 | Reuter | 475/202 |
| 5,931,255 A | * | 8/1999 | Sewell | 180/374 |
| 7,350,603 B2 | * | 4/2008 | Takami et al. | 180/65.25 |
| 2006/0048992 A1 | * | 3/2006 | Gansloser et al. | 180/233 |
| 2008/0099267 A1 | * | 5/2008 | Ruehle et al. | 180/233 |

FOREIGN PATENT DOCUMENTS

| | | |
|---|---|---|
| BE | 5 07 965 A | 1/1952 |
| DE | 42 27 545 A1 | 11/1993 |
| DE | 202 12 093 U1 | 10/2002 |
| DE | 10 2004 020 574 A | 11/2005 |

* cited by examiner

*Primary Examiner*—Lesley Morris
*Assistant Examiner*—Marlon A Arce
(74) *Attorney, Agent, or Firm*—Davis & Bujold, P.L.L.C.

(57) ABSTRACT

A drivetrain for an all-wheel drive motor vehicle which includes a longitudinally arranged central transmission, a transfer box, a Cardan shaft and two drive axles arranged normal to the direction of travel. The transfer box includes a central differential, an input and two output shafts. The input shaft of the central transmission communicates with an engine crankshaft. The transfer box input shaft is connected to an output shaft and an input element of the central differential. The first output shaft of the transfer box is connected to a first output element of the central differential and the first drive axle. The second output shaft of the transfer box is actively connected to a second output element of the central differential and to the second drive axle. The two output shafts of the transfer box are coaxially arranged at an angle to the output shaft of the central transmission.

10 Claims, 1 Drawing Sheet

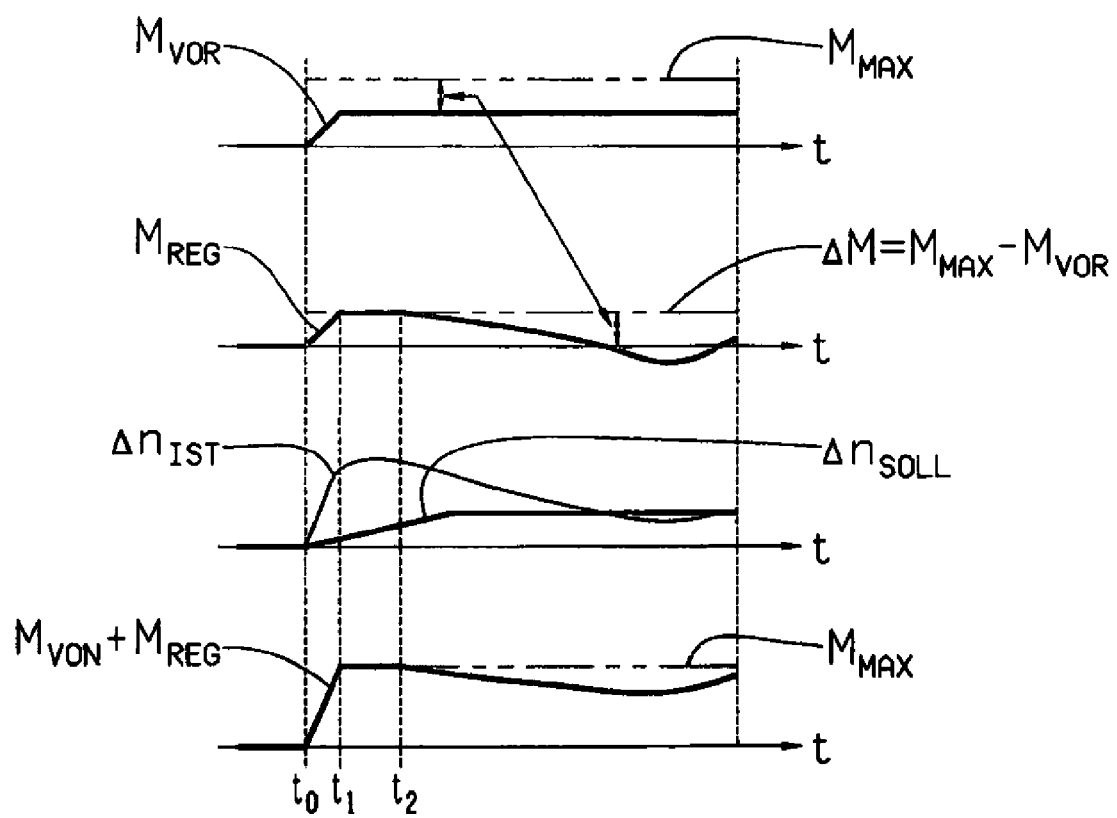

DRIVETRAIN FOR VEHICLES WITH ALL-WHEEL DRIVE AND A TRANSMISSION ARRANGED ALONG THE TRAVEL DIRECTION

Based on German Application No. DE 10 2008 000 017.5 which was filed on Jan. 9, 2008.

FIELD OF INVENTION

The invention concerns a drivetrain for a motor vehicle with all-wheel drive, having a drive engine, a central transmission, a transfer box, a Cardan shaft, a first drive axle and a second drive axle

BACKGROUND OF THE INVENTION

Motor vehicles with all-wheel drive and a transmission arranged along the travel direction are widely known from the prior art. For example, DE 202 12 093 U1 discloses a drivetrain for motor vehicles, in which a central transmission, which is arranged essentially along the travel direction of the motor vehicle and is suitable for providing various transmission ratios between the transmission input and the transmission output, is actively connected with a drive engine of the motor vehicle via a starting element made for example as a torque converter, and is actively connected to a driven rear axle and to a driven front axle of the motor vehicle via a transfer box. The transfer box, for example made as a Torsen differential, has an input shaft and two output shafts. The input shaft of the transfer box, which is permanently connected to the output shaft of the central transmission, is arranged coaxially with or axis-parallel to the output shaft of the central transmission. The two output shafts of the transfer box are arranged coaxially with one another. The first of these two output shafts of the transfer box is actively connected to the front axle of the motor vehicle via a spur drive and a side-shaft and a front axle differential. In this case, as a special design feature to save structural space it is provided that the side-shaft does not extend axis-parallel to the main shaft of the central transmission, and the spur drive therefore has so-termed beveloid teeth with a driven, conical spur gear and a cylindrical follower spur gear. The second of the two output shafts of the transfer box is actively connected to the rear axle of the motor vehicle via a cardan shaft and a rear axle differential. Viewed in the vertical direction of the drivetrain, the cardan shaft has no angular offset relative to the second output shaft of the transfer box.

From DE 42 27 545 A1 a multi-shaft variable-speed transmission for a motor vehicle with all-wheel drive is known, which is arranged on the driven rear axle. One of the main shafts of this transmission, arranged axis-parallel to one another is the output shaft of the transmission that leads to the rear axle, and one of the two shaft ends of this main or output shaft is therefore made as a pinion, which meshes with a spur bevel gear of a rear axle differential. The output shaft leading to the rear axle is also connected, via a spur drive, to a clutch cylinder of a hydraulically actuated disk clutch made as its outer disk carrier. The inner disk carrier of the clutch forms the drive output of the transmission to the driven front axle of the motor vehicle. As a special design feature, in this case it is provided that the clutch is integrated in the housing of the transmission in a space-saving manner, close to the main shaft of the transmission leading to the rear axle as viewed spatially, such that the longitudinal axis of the clutch is not axis-parallel to the main shaft of the transmission. Accordingly, the spur drive has so-termed beveloid teeth, with a driven cylindrical spur gear (on the transmission side) and a conical follower spur gear (on the clutch side).

SUMMARY OF THE INVENTION

The purpose of the present invention is to provide a drivetrain alternative to those of the type-defining prior art for a motor vehicle with all-wheel drive, which can be fitted into such a vehicle even though the diameter of the central transmission may be comparatively large and the space available in the fitting area of the transmission under the floor of the vehicle is relatively restricted.

Thus, the point of departure for the invention is a drivetrain for a motor vehicle with all-wheel drive, known from DE 202 12 093 U1, which comprises a drive engine, a central transmission, a transfer box, a cardan shaft, a first drive axle and a second drive axle, having the following characteristics:—an input shaft of the central transmission is connected to a torque-producing crankshaft of the drive engine or actively connected to the crankshaft of the drive engine by a drive-transmitting starting element; an output shaft of the central transmission is arranged essentially along the travel direction of the motor vehicle or essentially in the direction of the longitudinal axis of the motor vehicle; the two drive axles are arranged essentially transversely with respect to the travel direction of the motor vehicle, or essentially transversely to its longitudinal axis; the transfer box comprises an input shaft, a central differential and two output shafts; the input shaft of the transfer box is connected to the output shaft of the central transmission and actively connected for drive transmission to an input element of the central differential; the first output shaft of the transfer box is connected to a first output element of the central differential and, via a first axle differential, actively connected to transmit drive to the first drive axle; the second output shaft of the transfer box is connected to a second output element of the central differential and to the Cardan shaft; the two output elements of the central differential and the two output shafts of the transfer box are arranged coaxially with one another; and the Cardan shaft is actively connected via a second axle differential to transmit drive to the second drive axle.

In contrast to the type-defining DE 202 12 093 U1, however, according to the present invention it is provided that the two output shafts of the transfer box are not arranged axis-parallel to the output shaft of the central transmission. Preferably, the first output shaft of the transfer box is formed as a side-shaft which extends coaxially with the second output shaft of the transfer box, not axis-parallel to the output shaft of the central transmission but to the side of the central transmission.

Thus, the central differential and the two output shafts of the transfer box are arranged at an angle to the central transmission, in a defined axial alignment which makes it possible for the side-shaft to extend along past the central transmission as far as the front axle differential. A typical value for such an angle between the output shaft of the central transmission (or the input shaft of the transfer box) and the first output shaft of the transfer box (or the side-shaft) is 4 to 6 degrees.

Advantageously, this oblique positioning of the side-shaft and the central differential in the sense of a beveloid drive enables fitting in a small under-floor area of a motor vehicle even if the diameter of the central transmission is comparatively large. In addition, the transfer box according to the invention is characterized by a simple design, with a small number of components and high efficiency.

In the force flow between the input shaft of the transfer box and the central differential a beveloid spur drive with two spur gears meshing with one another can be arranged, in such manner that the spur gear on the drive input side connected to the input shaft of the transfer box is made as a cylindrical gear and the spur gear on the drive output side connected to the input element of the central differential is made as a conical gear.

However, in the force flow between the input shaft of the transfer box and the central differential, it is also possible to arrange a beveloid spur drive with two mutually meshing spur gears, such that the spur gear on the drive input side connected to the input shaft of the transfer box is made as a conical gear and the spur gear on the drive output side connected to the input element of the central differential is made as a cylindrical gear.

In another design of the invention it is provided that relative to the longitudinal axis of the central transmission the Cardan shaft is inclined in the vertical and horizontal planes. In this case the second axle differential—for example that associated with the rear axle of the motor vehicle—can comprise a conical drive with a pinion on the drive input side and a spur bevel gear on the drive output side that meshes with the pinion, whose teeth are made as beveloid teeth. Depending on the inclination of the Cardan shaft, the second axle differential can also comprise a conical drive with combined hypoid-beveloid gearing.

The central differential constituting the torque distribution device between the two drive axles of the motor vehicle can be of any desired structure. Examples of suitable structures for the central differential include the following.

A Torsen differential, whose cage is connected to the spur gear of the beveloid spur drive on the drive output side.

A bevel gear differential, whose cage is connected to the spur gear of the beveloid spur drive on the drive output side, with or without an additional mechanical, hydraulic, pneumatic, electric-motor or electrically actuated locking device for locking this bevel gear differential or for producing a defined rotation speed difference between the two output elements of the bevel gear differential.

A planetary gear differential, with or without an additional mechanical, hydraulic, pneumatic, electric-motor or electrically actuated locking device for locking this bevel gear differential or for producing a defined rotation speed difference between the two output elements of the bevel gear differential.

A mechanically, hydraulically, pneumatically, electric-motor or electrically actuated friction clutch (shiftable or slip-regulated disk clutch or Haldex® clutch) or one made as a Visco-clutch, with a clutch input element connected both to the spur gear of the beveloid spur drive on the drive output side and also to one of the two output shafts of the transfer box, and with a clutch output element connected to the respective other output shaft of the transfer box.

The central transmission itself, as such, can be a transmission of any type, for example an automated or manually shifted spur gear variable-speed transmission, an automatic or automated variable-speed transmission configured as a planetary transmission or a double-clutch transmission, or an automatic transmission with continuously variable ratio change configured as a toroid transmission or a wrap-around transmission.

The starting element of the drivetrain can be made as a torque-transmitting active connection between the drive engine and the transmission output, according to need as an external starting element of any desired structure, or as a starting element inside the transmission. Customary structures for an external starting element are hydraulic torque converters, hydraulic clutches (Föttinger clutches), wet-running or dry disk clutches, centrifugal clutches and magnetic-powder clutches. An external starting element of this type is usually arranged in the force flow direction between the drive engine and the transmission input, but it can also be positioned beyond the transmission as viewed in the force flow direction. Particularly suitable as transmission-internal starting elements are the frictional shift elements of the transmission, which are also used for engaging gears or for determining the travel direction.

The axle differential associated with the first driven axle and the central transmission can be combined as a structural group, with a common housing or with a common part of a housing, or in such manner that the housing of the central transmission is connected directly to a housing of the first axle differential.

In a similar manner the transfer box and the central transmission can be combined as a structural group, with a common housing or a common part of a housing, or in such manner that the housing of the central transmission is connected directly to a housing of the transfer box.

BRIEF DESCRIPTION OF THE DRAWINGS

Below, the invention is explained with reference to the attached drawing. The (single) FIGURE shows a schematic representation of an example drivetrain of a motor vehicle with all-wheel drive according to the invention.

DETAILED DESCRIPTION OF THE DRAWINGS

The drivetrain, here pictured as seen from above, comprises the following basic components: a drive engine 100, for example an internal combustion engine, a central transmission 200 of any desired structure, a transfer box 300, a first driven axle, for example a front axle 400 of the motor vehicle and a second driven axle, for example a rear axle 500 of the motor vehicle.

The drive engine 100, here for example arranged in the area of the front axle 400, has a torque-producing crankshaft 101 which, via a starting element 102 for example consisting of a torque converter or clutch, is in active, drive-transmitting connection with an input shaft 201 of the central transmission 200. The gear-engaging or transmission-ratio-producing central transmission 200 has an output shaft 202 which is connected to an input shaft 301 of the transfer box 300. This input shaft 301 is actively connected to a central differential 310 of the transfer box 300 by means of a drive-transmitting beveloid spur drive 320 consisting of two meshing spur gears 321, 322. The central differential 310 is made for example as a bevel gear differential and serves, as necessary, to distribute the drive output torque of the central transmission to the two driven axles 400, 500. For that purpose the cage of the bevel gear differential forms the input element 311 of the central differential 310 and is connected to the drive-output-side spur gear 322 of the beveloid spur drive 320. In the example illustrated, the drive-input-side spur gear 321 connected to the input shaft 301 of the transfer box 300 is made as a bevel gear, whereas the drive-output-side spur gear 322 connected to the input element 311 of the central differential 310 is made as a cylindrical gear.

In a design of the beveloid spur drive 320 arranged between the input shaft 301 of the transfer box 300 and the central differential 310 different from the above, the drive-input-side spur gear connected to the input shaft 301 of the transfer box 300 can be made as a cylindrical gear, whereas the drive-output-side spur gear connected to the input element 311 of the central differential 310 is made as a bevel gear.

Depending on the desired rotational direction, the beveloid spur drive arranged in the force flow between the input shaft of the transfer box and the central differential can also consist of three gears, and in that case the central spur gear of the beveloid spur drive is made as a cylindrical gear which meshes both with the drive-input-side spur gear of the beveloid spur drive connected to the input shaft of the transfer box and with the drive-output-side spur gear of the beveloid spur drive connected to the input element of the central differential.

From the FIGURE it can also be seen that in addition to the input shaft 301, the transfer box 300 has two output shafts 302, 303 arranged coaxially with one another. The first output shaft 302 is associated with the front axle drive and the second output shaft 303 with the rear axle drive.

The first output shaft 302 of the transfer box 300 is made as a side-shaft connected on the drive input side with a first output element 312 of the central differential 310 in this case made as a bevel gear, which is connected on the drive output side to a bevel drive 411 of a front axle differential 410 associated with the front axle 400. Accordingly, a drive-transmitting active connection exists between the drive engine 100 and the front axle 400. The driven wheels of the front axle 400 are indexed 401 and 402.

Viewed spatially, the first output shaft 302 of the transfer box 300 formed as a side-shaft 302 extends on one side of the central transmission 200, in such manner that the axis 601 of the side-shaft and the longitudinal axis 600 are at a defined angle 602 to one another. Thus, the central differential 310, complete with its two output elements 312, 313 and the two output shafts 302, 303 of the transfer box 300 are arranged not axis-parallel to the output shaft 202 of the central transmission 200. Furthermore, in the example illustrated the drive engine 100, the central transmission 200, the transfer box 300 and the front axle differential 410 form a compact unit of the drivetrain on the housing side.

On its drive input side the second output shaft 303 of the transfer box 300 arranged coaxially with the first output shaft 302 is connected to a second output element 313 of the central differential 310, in this case made as a bevel gear, and on its drive output side it articulated via a first joint 514 to the cardan shaft 513. In turn, the cardan shaft 513 is articulated via a second joint 515 to a bevel drive 511 of a rear axle differential 510 associated with the rear axle 500. Thus, an active drive-transmitting connection also exists between the drive engine 100 and the rear axle 500. The driven wheels of the rear axle 500 are indexed 501 and 502. Since on the one hand the second output shaft 303 of the transfer box 300 is not arranged axis-parallel to the output shaft 202 of the central transmission 200, nor axis-parallel to the longitudinal axis 600, but on the other hand the rear axle differential 510, viewed in the horizontal plane of the drivetrain, is arranged approximately centrally with respect to the output shaft 202 of the central transmission 200 and approximately centrally with respect to the longitudinal axis 600, the Cardan shaft 513 too must also run at an angle 603 to the longitudinal axis 600. Depending on the spatial position of the rear axle differential 510 relative to the two wheels 501, 502 of the rear axle, the angles 602 and 603 are different from one another. Usually, the Cardan shaft 513 is arranged inclined relative to the longitudinal axis 600 also in the vertical plane of the drivetrain.

INDEXES

100 Drive engine
101 Crankshaft of the drive engine
102 Starting element: torque converter
200 Central transmission
201 Input shaft of the central transmission
202 Output shaft of the central transmission
300 Transfer box
301 Input shaft of the transfer box
302 First output shaft of the transfer box, side-shaft
303 Second output shaft of the transfer box, side-shaft
310 Central differential of the transfer box
311 Input element of the central differential, cage
312 First output element of the central differential
313 Second output element of the central differential
320 Beveloid spur drive of the transfer box
321 Drive-input-side spur gear of the beveloid spur drive
322 Drive-output-side spur gear of the beveloid spur drive
400 First driven axle, front axle
401 Wheel of the first driven axle, front wheel
402 Wheel of the first driven axle, front wheel
410 First axle differential, front axle differential
411 Bevel drive of the first axle differential, bevel drive of the front axle differential
500 Second driven axle, rear axle
501 Wheel of the second driven axle, rear wheel
502 Wheel of the second driven axle, rear wheel
510 Second axle differential, rear axle differential
511 Bevel drive of the second axle differential, bevel drive of the rear axle differential
513 Cardan shaft
514 First joint on the Cardan shaft
515 Second joint on the Cardan shaft
600 Longitudinal axis of the motor vehicle
601 Side-shaft axis
602 Angle between side-shaft-axis and longitudinal axis of the motor vehicle in the horizontal plane
603 Angle between Cardan shaft and longitudinal axis of the motor vehicle in the horizontal plane

The invention claimed is:

1. A drive train for an all-wheel drive motor vehicle, the drive train comprising:
   a drive engine (100) having a torque-producing crankshaft (101) which is one of directly coupled to an input shaft (201) of a central transmission (200) and is actively connected, via a drive-transmitting starting element (102), with the input shaft (201) of the central transmission (200);
   an output shaft (202) of the central transmission (200) being arranged substantially along a longitudinal axis (600) of the vehicle;
   first and second drive axles (400, 500) being arranged substantially normal to the longitudinal axis (600) of the motor vehicle;
   a transfer box (300) comprising an input shaft (301), a central differential (310) and first and second output shafts (302, 303);
   the input shaft (301) of the transfer box (300) being connected to the output shaft (202) of the central transmission and drivingly connected to an input element (311) of the central differential (310);
   the first output shaft (302) of the transfer box (300) being connected to a first output element (312) of the central differential (310) and, via a first axle differential (410), drivingly connected to the first drive axle (400);
   the second output shaft (303) of the transfer box (300) being connected to a second output element (313) of the central differential (310) and to a Carden shaft (513);
   the first and the second output elements (312, 313) of the central differential (310) and the first and the second output shafts (302, 303) of the transfer box (300) being arranged coaxially with one another;

the Cardan shaft (513) being drivingly connected, via a second axle differential (510), to the second drive axle (500);

the first and the second output shafts (302, 303) of the transfer box (300) are at an angle with respect to the output shaft (202) of the central transmission (200); and a beveloid spur drive (320), with two meshing spur gears (321, 322), is arranged in a power flow between the input shaft (301) of the transfer box (300) and the central differential (310), and a spur gear (321) connected on a drive input side of the spur drive (320) to the input shaft (301) of the transfer box (300) is a cylindrical gear and the spur gear (322) connected to the input element (311) of the central differential (310) on a drive output side of the spur drive (320) is a bevel gear.

2. A drive train for an all-wheel drive motor vehicle, the drive train comprising:

a drive engine (100) having a torque-producing crankshaft (101) which is one of directly coupled to an input shaft (201) of a central transmission (200) and is actively connected. via a drive-transmitting starting element (102), with the input shaft (201) of the central transmission (200);

an output shaft (202) of the central transmission (200) being arranged substantially along a longitudinal axis (600) of the vehicle;

first and second drive axles (400, 500) being arranged substantially normal to the longitudinal axis (600) of the motor vehicle:

a transfer box (300) comprising an input shaft (301), a central differential (310) and first and second output shafts (302, 303);

the input shaft (301) of the transfer box (300) being connected to the output shaft (202) of the central transmission and drivingly connected to an input element (311) of the central differential (310);

the first output shaft (302) of the transfer box (300) being connected to a first output element (312) of the central differential (310) and, via a first axle differential (410), drivingly connected to the firs drive axle (400);

the second output shaft (303) of the transfer box (300) being connected to a second output element (313) of the central differential (310) and to a Cardan shaft (513);

the first and the second output elements (312, 313) of the central differential (310) and the first and the second output shafts (302, 303) of the transfer box (300) being arranged coaxially with one another;

the Cardan shaft (513) being drivingly connected, via a second axle differential (510), to the second drive axle (500);

the first and the second output shafts (302, 303) of the transfer box (300) are at an angle with respect to the output shaft (202) of the central transmission (200); and a beveloid spur drive (320), with two meshing spur gears (321, 322), is arranged in a power flow between the input shaft (301) of the transfer box (300) and the central differential (310), and a spur gear (321) connected on a drive input side of the spur drive (320) to the input shaft (301) of the transfer box (300) is a bevel gear and the spur gear (322) connected to the input element (311) of the central differential (310) on a drive output side of the spur drive (320) is a cylindrical gear.

3. The drive train according to claim 1, wherein the first output shaft (302) of the transfer box (300) is a side-shaft which extends coaxially with the second output shaft (303) of the transfer box (300), at an angle to the output shaft (202) of the central transmission (200) and laterally with respect to the central transmission (200).

4. The drive train according to claim 1, wherein the Cardan shaft (513) is arranged at an inclination in vertical and horizontal planes relative to the longitudinal axis (600) of the motor vehicle.

5. The drive train according to claim 4, wherein the second axle differential (510) comprises a bevel drive (511) with one of beveloid or combined hypoid-beveloid gearing.

6. The drive train according to claim 1, wherein the central differential (310) is a Torsen differential with a cage connected to the spur gear (322) of the beveloid spur drive (320) on the drive output side.

7. The drive train according to claim 1, wherein the central differential (310) is a bevel gear differential with a cage (311) connected to the spur gear (322) of the beveloid spur drive (320) on the drive output side.

8. The drive train according to claim 1, wherein the central differential (310) is a planetary gear differential.

9. The drive train according to claim 7, wherein the central differential (310) additionally comprises one of a mechanically locking device, a hydraulically locking device, a pneumatically locking device, an electric-motor locking device or an electrically actuated locking device for one of locking the central differential (310) or producing a defined rotational speed difference between the first and the second output elements (312, 313) of the central differential (310).

10. The drive train according to claim 1, wherein the central differential (310) is one of a mechanically, a hydraulically, a pneumatically, an electric-motor or an electrically actuated friction clutch or Visco-clutch, with a clutch input element which is connected both to the spur gear (322) of the beveloid spur drive (320) on the drive output side and to one of the first or the second output shafts (302, 303) of the transfer box (300), and with a clutch output element which is connected to the respective other of the first or the second output shafts (302, 303) of the transfer box (300).

* * * * *